(12) United States Patent
Liu et al.

(10) Patent No.: US 6,601,561 B1
(45) Date of Patent: *Aug. 5, 2003

(54) COMBUSTION CHAMBER

(75) Inventors: Zhengbai Liu, Lisle, IL (US); Xinqun Gui, Lisle, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 5 days.

This patent is subject to a terminal disclaimer.

(21) Appl. No.: 10/060,663

(22) Filed: Jan. 30, 2002

(51) Int. Cl.$^7$ .................................................. F02F 3/26
(52) U.S. Cl. ........................................ 123/276; 123/263
(58) Field of Search ................................ 123/279, 263, 123/276

(56) References Cited

U.S. PATENT DOCUMENTS

| | | | |
|---|---|---|---|
| 4,221,190 A | * | 9/1980 | Komiyama et al. ......... 123/263 |
| 4,721,080 A | | 1/1988 | Moriyasu et al. |
| 4,883,032 A | | 11/1989 | Hunter et al. |
| 5,029,563 A | | 7/1991 | Hu |
| 5,285,755 A | | 2/1994 | Reguiero |
| 5,657,726 A | | 8/1997 | Diggs |
| 5,868,112 A | | 2/1999 | Mahakul et al. |
| 5,954,038 A | | 9/1999 | Warwick et al. |
| 6,161,518 A | * | 12/2000 | Nakakita et al. ............. 123/298 |
| 6,536,404 B2 | * | 3/2003 | Liu et al. ..................... 123/263 |

* cited by examiner

*Primary Examiner*—Tony M. Argenbright
*Assistant Examiner*—Katrina B. Harris
(74) *Attorney, Agent, or Firm*—Dennis Kelly Sullivan; Susan L. Lukasik; Jeffrey P. Calfa

(57) ABSTRACT

A combustion chamber assembly for use in a diesel engine includes a combustion chamber being defined in a crown of a piston, the combustion chamber having a center portion, the center portion being defined at least in part by a portion of a convex sphere to define a post, the sphere having a radius and an origin, the origin of the radius lying on a combustion chamber central axis and the combustion chamber further having an outwardly radially disposed bottom margin, the bottom margin being defined in part by a portion of a sphere, the sphere being concave and having an origin and a radius. The combustion chamber has more than two spherical surfaces having smooth annular transitions between adjacent spherical surfaces, the spherical surfaces including the spherical center portion and the spherical bottom margin. A piston and a method of forming a combustion chamber are further included.

85 Claims, 2 Drawing Sheets

COMBUSTION CHAMBER

TECHNICAL FIELD

The present invention relates to a piston designed for use in a compression ignition (diesel) internal combustion engine. More particularly, the present invention relates to a combustion chamber defined in the crown of a piston.

BACKGROUND OF THE INVENTION

Many attempts have been made to produce an ideal flow pattern for the charge of air and fuel within the combustion chamber of an internal combustion engine. Considerations that must be taken into effect include, but are not limited to, providing for adequate power generation minimizing the NOx entrained in the engine exhaust and minimizing the amount of soot particulate also entrained in the engine exhaust. This should be accomplished without hurting the fuel economy of the engine and without adversely affecting the power output of the engine.

It is known that changes in any one of a variety of engine design/operating variables, such as engine compression, combustion chamber shape, fuel injection spray pattern, and other variables can have an effect on both emissions and power generated.

The amount of soot that is expelled with the engine's exhaust is unsightly and generates public pressure to clean up diesel engines. Further, the amount of soot that is entrained in the engine's lubrication oil can have a deleterious effect on engine reliability. Soot is very abrasive and can cause high engine wear.

There is additionally a great deal of pressure to reduce the NOx emissions from the engine. Ever increasing regulatory demands mandate reduced levels of NOx Typically, a combustion chamber design that is effective at reducing NOx levels has been found to increase the levels of soot and vice-versa. Additionally, doing either of the aforementioned typically reduces engine torque and power outputs.

There are numerous examples of combustion chambers formed in the crown of piston. Notwithstanding all these prior art designs, there remains a need for reduction both in NOx and entrained soot while at the same time maintaining or enhancing engine torque and power outputs without adversely affecting the fuel economy of the engine.

SUMMARY OF THE INVENTION

The piston of the present invention substantially meets the aforementioned needs of the industry. The combustion chamber of the present invention defined in the crown of the piston has been shown by substantiated simulation to both reduce soot entrainment and NOx emissions while at the same time maintaining engine power output. The piston has been shown to function effectively with cylinder heads having two or more valves. A further advantage of the piston of the present invention is that by being symmetrical with respect to a piston central axis, the combustion chamber is relatively easily formed in the crown of the piston. The piston and combustion chamber of the present invention are preferably used in heavy-duty and medium-duty diesel engines.

The present invention is a combustion chamber assembly for use in a diesel engine and includes a combustion chamber being defined in a crown of a piston, the combustion chamber having a center portion, the center portion being defined at least in part by a portion of a convex sphere to define a post, the sphere having a radius and an origin, the origin of the radius lying on a combustion chamber central axis and the combustion chamber further having an outwardly radially disposed bottom margin, the bottom margin being defined in part by a portion of a sphere, the sphere being concave and having an origin and a radius. The combustion chamber has more than two spherical surfaces having smooth annular transitions between adjacent spherical surfaces, the spherical surfaces including the spherical center portion and the spherical bottom margin. A piston and a method of forming a combustion chamber are further included. The present invention is further a piston incorporating the aforementioned combustion chamber and a method of forming the combustion chamber.

DETAILED DESCRIPTION OF THE DRAWINGS

Figure 1:
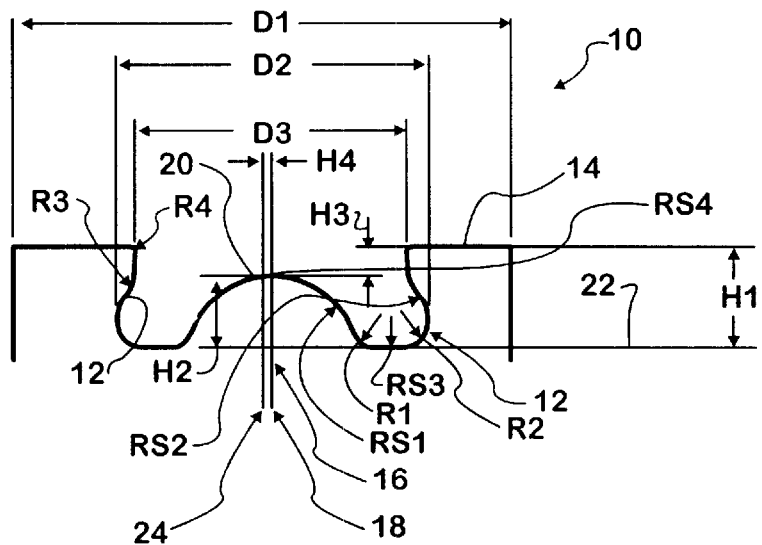
FIG. 1 is a sectional view of the piston and combustion chamber of the present invention.

The piston of the present invention is shown generally at 10 in FIG. 1. Generally, the piston 10 has a centrally located symmetrical upward directed cavity for forming a portion of a combustion chamber 12 within a cylinder of a diesel engine. The combustion chamber 12 is defined in the crown 14 of the piston 10. The engine has a fuel injector for forming a fuel injection plume relative to the combustion chamber 12. The piston 10 may be utilized with two-valve or multiple-valve heads. The piston 10 is effective at reducing diesel engine pollutant emissions, such as NOx and soot, as depicted in the graphic representations of FIGS. 2 and 3. The piston 10 is preferably applicable to heavy-duty and medium duty diesel engines.

The piston 10 has a symmetrical upwardly opening cavity for forming a major part of a combustion chamber 12 within a cylinder of a diesel engine having a fuel injector for forming a fuel injection plume in order to reduce diesel engine pollutant emissions such as NOx and soot without hurting the fuel economy and power output.

The combustion chamber 12 located in the piston crown 14 of diesel engines and mainly comprises a portfolio of spherical surfaces, as shown in FIG. 1. Two spherical surfaces, RS1 and RS2, with a co-center 16 lying on the chamber axis 18 form the major part of the combustion chamber 12. The inner spherical surface RS1 is located at the central bottom of the combustion chamber 12 to form a post 20 and has a radius of RS1. The outer spherical surface RS2 forms the lower part of the sidewall of the combustion chamber 12 and has a radius of RS2. A third spherical surface RS3, having a radius of RS3, forms the outer bottom margin of the combustion chamber 12. A fourth spherical surface RS4 has a radius of RS4 and forms the higher part of the sidewall of the combustion chamber 12.

Four small annular surfaces R1-R4 function as connection and transition between adjacent spherical surfaces and with the crown 14. The inner spherical surface RS1 and the outer bottom spherical surface RS3 are connected by an annular surface that has a radius of R1. The lower sidewall spherical surface RS2 and the outer bottom spherical surface RS3 are connected by an annular surface that has a radius of R2. The lower sidewall spherical surface RS2 and the higher sidewall spherical surface RS4 are connected by an annular surface that has a radius of R3. The higher sidewall spherical surface RS4 transits to or reenters the piston crown 14 through a small annular surface R4 that has a radius of R4.

The origins of spherical surfaces RS1 and RS2 are in coincidence with each other, that is, they have a co-center 16, and the co-center 16 is located on the central axis 18 of the combustion chamber 12. The distance between the co-center 16 of spherical surfaces RS1 and RS2 and the point of intersection of the combustion chamber axis 18 with the bottom plane 22 of the combustion chamber is equal to or greater than zero and is less than 0.28 D1, D1 being the piston diameter, and is preferably 0.073 D1. The origin of the spherical surface RS3 is on the central axis 18 of the combustion chamber, and the distance between the origin of spherical surface RS3 and the point of intersection of the combustion chamber axis 18 with the bottom of the plane 22 of the combustion chamber 12 is greater than 0.75 D1 and less than 3.0 D1, and is preferably 2.178 D1. The origin of the spherical surface RS4 is on the central axis 18 of the combustion chamber 12, and the distance between the origin of spherical surface RS4 and the point of intersection of the combustion chamber axis 18 with the crown 14 of the piston 10 is equal to H3. The ratio of H3/D1 is greater than 0.02 and is less than 0.42, and is preferably 0.051.

The central axis 18 of the combustion chamber 12 can coincide with the central axis 24 of the piston 10 or has an offset, that is the distance H4 between the central axis 18 of the combustion chamber 12 and the central axis 24 of the piston 10 is equal to or greater than zero and is less than 0.1 D1, and is preferably zero. Preferably then, the axes 18 and 24 are coincident.

The other relationship of parameters also controls the combustion chamber geometry, and the combustion performance and emissions in diesel engines, are as listed below:

1. The ratio of D2/D1 is greater than 0.43 and is less than 0.83, and is preferably 0.637, D2 being the maximum diameter of the combustion chamber.
2. The ratio of D3/D1 is greater than 0.33 and is less than 0.83 and is preferably 0.548, D3 being the minimum diameter of the combustion chamber.
3. The ratio of RS1/D1 is greater than 0.05 and is less than 0.35, and is preferably 0.18.
4. The ratio of RS2/D1 is greater than 0.23 and is less than 0.53, and is preferably 0.334.
5. The ratio of RS3/D t is greater than 1.18 and is less than 4.18, and is preferably 2.18.
6. The ratio of RS4/D1 is greater than 0.18 and is less than 0.38, and is preferably 0.28.
7. The ratio of H1/D1 is greater than 0.1 and is less than 0.4 and is preferably 0.2, H1 being the depth of the combustion chamber.
8. The ratio of H2/D1 is greater than 0.04 and is less than 0.24, and is preferably 0.144, H2 being the height of the post.
9. The radius of the annular surface R1 is equal to the radius of the annular surface R2. The ratio of R1/D1 and R2/D1 are each greater than 0.03 and less than 0.25, and is preferably 0.051.
10. The radii of the annular surfaces R3 and R4 are very small. Therefore, ratio of R3/D1 and R4/D1 are each greater than zero and less than 0.1.

The curves and smooth transitions of the combustion chamber 12 as previously described promote smooth flow in the combustion chamber 12 and act to reduce the thermal loading in the combustion chamber 12. Further, the combustion chamber 12 is preferably symmetrical about the piston axis 24, but may be offset the distance H4 as noted in FIG. 1. Accordingly, it is much easier to turn (form) the combustion chamber 12 as compared to an asymmetrical combustion chamber defined in a piston.

Figure 2:
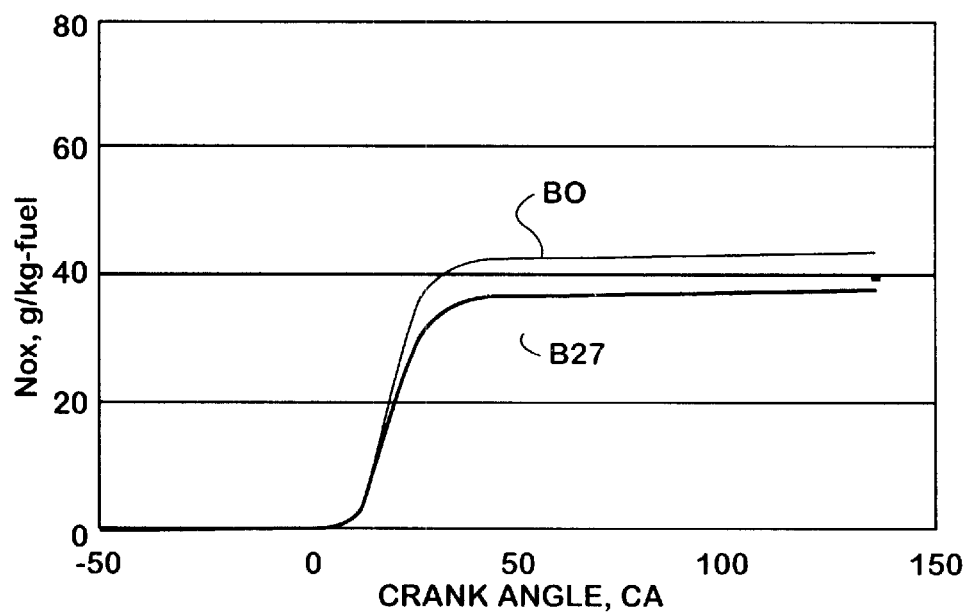
FIG. 2 is a graphic representation of NOx generated with respect to crank angle of empirical data of a prior art engine, B0, a simulation, B0 of the same engine to substantiate the validity of the simulation, substantially overlying the empirical data, and a simulation of an engine with pistons and combustion chambers of the present invention, B27.
Figure 3:
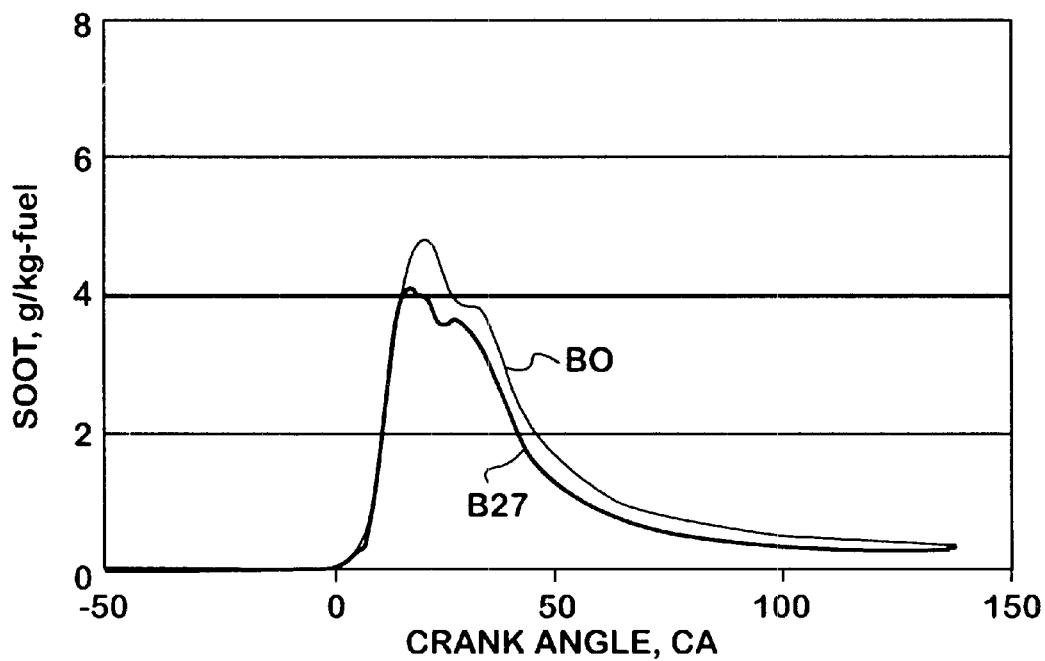
FIG. 3 is a graphic representation of the soot generated by the prior art B0 piston and combustion chamber as compared to the piston and combustion chamber of the present invention, B27.

It should be noted in FIGS. 2 and 3 that the simulations for prior art engine and the experimental results for the prior art engine are in substantial agreement (the empirical and simulation traces B0 and B0 are substantially coincident) as an indication of the validity of the simulation. Combustion performance improvement and pollutant emission reduction are depicted in FIGS. 2 and 3. FIG. 2 depicts the NOx generation of a known combustion chamber as depicted by line B0 and the simulated results of NOx generation of the combustion chamber 12 of the present invention as depicted in line B27. It is noted that the NOx generation by the combustion chamber 12 of the present invention is significantly less than the NOx of the known combustion chamber as depicted by line B0.

FIG. 3 depicts the simulated soot generation of a known combustion chamber as depicted by line B0 in comparison with the simulated soot generation of the combustion chamber 12 of the present invention as depicted by line B27. It should be noted that soot generation of the combustion chamber 12 (line B27) is significantly less than the soot generation of the known combustion chamber (line B0).

It will be obvious to those skilled in the art that other embodiments in addition to the ones described herein are indicated to be within the scope and breadth of the present application. Accordingly, the applicant intends to be limited only by the claims appended hereto.

What is claimed is:

1. A combustion chamber assembly for use in a diesel engine, comprising:
   a combustion chamber being defined in a crown of a piston, the combustion chamber having a center portion, the center portion being defined at least in part by a portion of a convex sphere to define a post, the sphere having a radius and an origin, the origin of the radius lying on a combustion chamber central axis and the combustion chamber further having an outwardly radially disposed bottom margin, the bottom margin being defined in part by a portion of a sphere, the sphere being concave and having an origin and a radius; and
   the combustion chamber having more than two spherical surfaces having smooth annular transitions between adjacent spherical surfaces, the spherical surfaces including the spherical center portion and the spherical bottom margin.

2. The combustion chamber assembly of claim 1 wherein the origins of the post and the lower sidewall spherical surfaces are co-centric and lie on the center axis of the combustion chamber.

3. The combustion chamber assembly of claim 2 wherein the side wall portion of the combustion chamber is substantially defined by two spherical surfaces.

4. The combustion chamber assembly of claim 3 wherein the two spherical surfaces substantially defining the side wall portion of the combustion are joined by an annular surface.

5. The combustion chamber assembly of claim 3 wherein a one of the two spherical surfaces substantially defining the higher side wall portion of the combustion is transitioned by an annular surface to a piston crown.

6. The combustion chamber assembly of claim 1 wherein the ratio of the radius of the center portion convex spherical surface, RS1, of the combustion chamber to the piston diameter, D1, is greater than 0.05 and less than 0.35.

7. The combustion chamber assembly of claim 6 wherein the ratio of the radius of the center portion convex spherical surface, RS1, of the combustion chamber to the piston diameter, D1, is substantially 0.18.

8. The combustion chamber assembly of claim 1 wherein the ratio of the combustion chamber diameter D2 to the piston diameter D1 is greater than 0.43 and less than 0.83.

9. The combustion chamber assembly of claim 8 wherein the ratio of the combustion chamber diameter D2 to the piston diameter D1 is preferably substantially 0.637.

10. The combustion chamber assembly of claim 1 wherein the ratio of the diameter of the reentrancy D3 to the piston diameter D1 is greater than 0.33 and less than 0.83.

11. The combustion chamber assembly of claim 10 wherein the ratio of the diameter of the reentrancy D3 to the piston diameter D1 is substantially 0.548.

12. The combustion chamber assembly of claim 1 wherein the ratio of the radius of the center convex spherical surface RS1 to the diameter of the piston D1 is greater than 0.05 and less than 0.35.

13. The combustion chamber assembly of claim 12 wherein the ratio of the radius of the center convex spherical surface RS1 to the diameter of the piston D1 is substantially 0.018.

14. The combustion chamber assembly of claim 1 wherein the ratio of the spherical surface RS2 to the diameter of the piston D1 is between 0.23 and 0.53.

15. The combustion chamber assembly of claim 14 wherein the ratio of the spherical surface RS2 to the diameter of the piston D1 is preferably substantially 0.334.

16. The combustion chamber assembly of claim 1 wherein the ratio of the spherical surface RS3 to the diameter of the piston D1 is between 1.18 and 4.18.

17. The combustion chamber assembly of claim 16 wherein the ratio of the spherical surface RS3 to the diameter of the piston D1 is preferably substantially 2.18.

18. The combustion chamber assembly of claim 1 wherein the ratio of the spherical surface RS4 to the diameter of the piston D1 is between 0.18 and 0.38.

19. The combustion chamber assembly of claim 18 wherein the ratio of the spherical surface RS4 to the diameter of the piston D1 is preferably substantially 0.28.

20. The combustion chamber assembly of claim 1 wherein the ratio of the depth dimension of the combustion chamber H1 to the diameter D1 of the piston is greater than 0.1 and less than 0.4.

21. The combustion chamber assembly of claim 20 wherein the ratio of the distance H1 to the diameter D1 of the piston is preferably substantially 0.2.

22. The combustion chamber assembly of claim 1 wherein the ratio of the certain distance H2, H2 being the post height distance from a peak of the center portion convex spherical surface to the bottom plane of the combustion chamber, to the diameter D1 of the piston is greater than 0.04 and less than 0.24.

23. The combustion chamber assembly of claim 22 wherein the ratio of the certain distance H2 to the diameter D1 is preferably substantially 0.144.

24. The combustion chamber assembly of claim 1 wherein the radius of the annular surface R1 is equal to the radius of the annular surface R2.

25. The combustion chamber assembly of claim 1 wherein the ratio of the annular surface radius R1 to the diameter of the piston D1 and the annular surface R2 to the diameter D1 are each greater than 0.03 and less than 0.25.

26. The combustion chamber assembly of claim 25 wherein the ratio of the annular sidewall surface radius R1 to the diameter of the piston D1 and the annular surface R2 to the diameter D1 are each preferably substantially 0.051.

27. The combustion chamber assembly of claim 1 wherein the ratio of the annular surface radius R3 to the diameter of the piston D1 and the ratio of the annular surface radius R4 to the diameter of the piston D1 are each greater than 0.0 and less than 0.1.

28. The combustion chamber assembly of claim 1 wherein the distance between the co-center of the spherical surfaces RS1, RS2 and the point of intersection of a combustion chamber axis with a bottom plane of the combustion chamber is less than 0.28 the piston diameter D1.

29. The combustion chamber assembly of claim 28 wherein the distance between the co-center of the spherical surfaces RS1, RS2 and the point of intersection of a combustion chamber axis with a bottom plane of the combustion chamber is preferably 0.073 D1.

30. The combustion chamber assembly of claim 1 wherein the origin of a spherical surface RS3 is on a central axis of the combustion chamber.

31. The combustion chamber assembly of claim 30 wherein the distance between the origin of the spherical surface RS3 and a point of intersection of the central axis of the combustion chamber with a bottom plane of the combustion chamber is greater than 0.75 the piston diameter D1 and less than 3.0 D1.

32. The combustion chamber assembly of claim 31 wherein the distance between the origin of the spherical surface RS3 and the point of intersection of the central axis of the combustion chamber with the bottom plane of the combustion chamber is preferably 2.178 D1.

33. The combustion chamber assembly of claim 1 wherein the origin of a spherical surface RS4 is on a combustion chamber central axis and the distance between the origin of the spherical surface RS4 and a point of intersection of the central axis of the combustion chamber with a top plane of the combustion chamber is the height H3 greater than 0.02 the piston diameter D1 and less than 0.42 D1.

34. The combustion chamber assembly of claim 33 wherein the ratio of the height H3 to the diameter of the piston D1 is greater than 0.02 and less than 0.42.

35. The combustion chamber assembly of claim 34 wherein the ratio of the height H3 to the diameter of the piston D1 is preferably substantially 0.051.

36. The combustion chamber assembly of claim 1 the combustion chamber having a central axis, the combustion chamber central axis being coincident with a piston central axis.

37. The combustion chamber assembly of claim 1 the combustion chamber having a central axis, the combustion chamber central axis being offset from a piston central axis.

38. The combustion chamber assembly of claim 37 the combustion chamber having a central axis, the combustion chamber central axis being offset from the piston central axis less than a distance equal to 0.1 the piston diameter D1.

39. The combustion chamber assembly of claim 1 being formed free of flat surfaces.

40. A piston for use in a diesel engine, the piston having a central axis, comprising:

a combustion chamber being defined in a crown of the piston, the combustion chamber having a center portion, the center portion being defined at least in part by a portion of a convex sphere to define a post, the sphere having a radius and an origin, the origin of the radius lying on a combustion chamber central axis and the combustion chamber further having an outwardly radially disposed bottom margin, the bottom margin being defined in part by a portion of a sphere, the sphere being concave and having an origin and a radius; and the combustion chamber having more than two spherical surfaces having smooth annular transitions between adjacent spherical surfaces, the spherical surfaces including the spherical center portion and the spherical bottom margin.

41. The piston of claim 40 wherein the origin of the post and the lower sidewall spherical surfaces are co-centric and lie on the center axis of the combustion chamber.

42. The piston of claim 41 wherein the side wall portion of the combustion chamber is substantially defined by two spherical surfaces.

43. The piston of claim 42 wherein the two spherical surfaces substantially defining the side wall portion of the combustion chamber are joined by an annular surface.

44. The piston of claim 42 wherein a one of the two spherical surfaces substantially defining the higher side wall portion of the combustion is transitioned by an annular surface to a piston crown.

45. The piston of claim 40 wherein the ratio of the radius of the center portion convex spherical surface, RS1, of the combustion chamber to the piston diameter, D1, is greater than 0.05 and less than 0.35.

46. The piston of claim 45 wherein the ratio of the radius of the center portion convex spherical surface, RS1, of the combustion chamber to the piston diameter, D1, is substantially 0.18.

47. The piston of claim 40 wherein the ratio of the combustion chamber diameter D2 to the piston diameter D1 is greater than 0.43 and less than 0.83.

48. The piston of claim 47 wherein the ratio of the combustion chamber diameter D2 to the piston diameter D1 is preferably substantially 0.637.

49. The piston of claim 40 wherein the ratio of the diameter of the reentrancy D3 to the piston diameter D1 is greater than 0.33 and less than 0.83.

50. The piston of claim 49 wherein the ratio of the diameter of the reentrancy D3 to the piston diameter D1 is substantially 0.548.

51. The piston of claim 40 wherein the ratio of the radius of the center convex spherical surface RS1 to the diameter of the piston D1 is greater than 0.05 and less than 0.35.

52. The piston of claim 51 wherein the ratio of the radius of the center convex spherical surface RS1 to the diameter of the piston D1 is substantially 0.018.

53. The piston of claim 40 wherein the ratio of the spherical surface RS2 to the diameter of the piston D1 is between 0.23 and 0.53.

54. The piston of claim 53 wherein the ratio of the spherical surface RS2 to the diameter of the piston D1 is preferably substantially 0.334.

55. The piston of claim 40 wherein the ratio of the spherical surface RS3 to the diameter of the piston D1 is between 1.18 and 4.18.

56. The piston of claim 55 wherein the ratio of the spherical surface RS3 to the diameter of the piston D1 is preferably substantially 2.18.

57. The piston of claim 40 wherein the ratio of the spherical surface RS4 to the diameter of the piston D1 is between 0.18 and 0.38.

58. The piston of claim 57 wherein the ratio of the spherical surface RS4 to the diameter of the piston D1 is preferably substantially 0.28.

59. The piston of claim 40 wherein the ratio of the depth dimension of the combustion chamber H1 to the diameter D1 of the piston is greater than 0.1 and less than 0.4.

60. The piston of claim 59 wherein the ratio of the distance H1 to the diameter D1 of the piston is preferably substantially 0.2.

61. The piston of claim 40 wherein the ratio of the certain distance H2, H2 being the post height distance from a peak of the center portion convex spherical surface to the bottom plane of the combustion chamber, to the diameter D1 of the piston is greater than 0.04 and less than 0.24.

62. The piston of claim 61 wherein the ratio of the certain distance H2 to the diameter D1 is preferably substantially 0.144.

63. The piston of claim 40 wherein the radius of the annular surface R1 is equal to the radius of the annular surface R2.

64. The piston of claim 40 wherein the ratio of the annular surface radius R1 to the diameter of the piston D1 and the ratio of the annular surface R2 to the diameter D1 are each greater than 0.03 and less than 0.25.

65. The piston of claim 64 wherein the ratio of the annular surface radius R1 to the diameter of the piston D1 and the annular.surface R2 to the diameter D1 are each preferably substantially 0.051.

66. The piston of claim 40 wherein the ratio of the annular surface radius R3 to the diameter of the piston D1 and the ratio of the annular surface radius R4 to the diameter of the piston D1 are each greater than 0.0 and less than 0.1.

67. The piston of claim 40 wherein the distance between the co-center of the spherical surfaces RS1, RS2 and the point of intersection of a combustion chamber axis with a bottom plane of the combustion chamber is less than 0.28 the piston diameter D1.

68. The piston of claim 67 wherein the distance between the co-center of the spherical surfaces RS1, RS2 and the point of intersection of a combustion chamber axis with the bottom plane of the combustion chamber is preferably 0.073 D1.

69. The piston of claim 40 wherein the origin of a spherical surface RS3 is on a central axis of the combustion chamber.

70. The piston of claim 69 wherein the distance between the origin of the spherical surface RS3 and a point of intersection of the central axis of the combustion chamber with a bottom plane of the combustion chamber is greater than 0.75 the piston diameter D1 and less than 3.0 D1.

71. The piston of claim 70 wherein the distance between the origin of the spherical surface RS3 and the point of intersection of the central axis of the combustion chamber with the bottom plane of the combustion chamber is preferably 2.178 D1.

72. The piston of claim 40 wherein the origin of a spherical surface RS4 is on a combustion chamber central axis and the distance between the origin of the spherical surface RS4 and a point of intersection of the central axis of the combustion chamber with a top plane of the combustion chamber is the height H3 greater than 0.02 the piston diameter D1 and less than 0.42 D1.

73. The piston of claim 72 wherein the ratio of the height H3 to the diameter of the piston D1 is greater than 0.02 and less than 0.42.

74. The piston of claim 73 wherein the ratio of the height H3 to the diameter of the piston D1 is preferably substantially 0.051.

75. The piston of claim 40, the combustion chamber having a central axis, the combustion chamber central axis being coincident with a piston central axis.

76. The piston of claim 40, the combustion chamber having a central axis, the combustion chamber central axis being offset from a piston central axis.

77. The piston of claim 76, the combustion chamber having a central axis, the combustion chamber central axis being offset from the piston central axis less than a distance equal to 0.1 the piston diameter D1.

78. The piston of claim 40, the combustion chamber being formed free of flat surfaces.

79. A method of forming a combustion chamber for use in a piston of a diesel engine, comprising:
   defining a combustion chamber in a crown of a piston, the piston having a central axis, the combustion chamber being formed by:
      defining a combustion chamber elevated center portion;
      defining the center portion at least in part by a portion of a convex sphere, the sphere having a radius,
      defining a combustion chamber bottom margin in part by a concave spherical surface, the concave spherical surface having a radius; and
      defining a plurality of combustion chamber spherical surfaces having smooth transitions between adjacent spherical surfaces, the spherical surfaces including at least the convex spherical center portion, the concave spherical bottom margin surface.

80. The method of claim 79 including defining the combustion chamber by a plurality of spherical surfaces and a plurality of annular surfaces.

81. The method of claim 80 including defining the combustion chamber by four spherical surfaces and adjoining annular surfaces.

82. The method of claim 79 including disposing the respective origins of the convex spherical center portion and the spherical lower sidewall surfaces co-centrically.

83. The method of claim 79 including forming the combustion chamber free of flat surfaces.

84. The method of claim 79 including displacing a combustion chamber central axis in a parallel relationship with a piston central axis.

85. The method of claim 79 including disposing a combustion chamber central axis co-linear with a piston central axis.

* * * * *